United States Patent [19]

Debande et al.

[11] 4,101,599
[45] Jul. 18, 1978

[54] HYDROGENATION PROCESS OF OLEFIN POLYMERS FOR PRODUCING WHITE OILS

[75] Inventors: Guy F. S. Debande, Watermael; Raymond N. M. Cahen, Etterbeek; Jacques F. J. Grootjans, Leefdael, all of Belgium

[73] Assignee: Labofina S.A., Brussels, Belgium

[21] Appl. No.: 777,907

[22] Filed: Mar. 15, 1977

[30] Foreign Application Priority Data

Mar. 16, 1976 [LU] Luxembourg ............................ 74570

[51] Int. Cl.$^2$ ............................................... C07C 5/14
[52] U.S. Cl. ................................... 260/683.9; 208/144
[58] Field of Search ......................... 260/683.9, 676 R; 208/255, 144, 216 PP, 89

[56] References Cited

U.S. PATENT DOCUMENTS

| | | | |
|---|---|---|---|
| 3,620,966 | 11/1971 | Haney et al. | 208/144 |
| 3,884,988 | 5/1975 | Girotti et al. | 260/683.9 |
| 3,957,898 | 5/1976 | Girotti et al. | 260/683.9 |

*Primary Examiner*—George Crasanakis

[57] ABSTRACT

A process for hydrogenating polymers which are derived from olefin units containing 4 carbon atoms is disclosed whereby white oils which exhibit a low iodine value (e.g., below 0.26) are obtained under relatively mild reaction conditions. The hydrogenation is effected in the presence of a catalyst comprising palladium on a bimodal alumina support ehibiting a total pore volume of at least 0.25 ml/g of which 35 to 50% are provided by small pores the mean size of which is below 300Å and 25 to 35% are provided by large pores the mean size of which is above 300Å and is at least 1.5 times the mean size of the small pores.

12 Claims, No Drawings

HYDROGENATION PROCESS OF OLEFIN POLYMERS FOR PRODUCING WHITE OILS

BACKGROUND OF THE INVENTION

The present invention relates to a process for preparing white oils by hydrogenating polymers derived from olefin units having 4 carbon atoms.

White oils usually are mineral oils which are prepared by high purification of petroleum fractions boiling in the lubricating oil boiling range. This process usually comprises two steps: a desulfurization followed by hydrogenation under very severe operating conditions. White oils are allowed to be used in or in contact with food only if they fulfill the official requirements for foodstuffs. The most widely applied standards correspond to the official requirements in the U.S. regulations promulgated by the FDA, the German regulations set forth in DAB VII and the British regulations set forth in the B.P. acid test.

It has already been proposed to purify polymers which are prepared from olefin units having 4 carbon atoms, particularly polybutenes, by means of a hydrogenation process, in order to obtain a colorless and substantially odorless polybutene which can be used, for example, as a substitute for natural squalane in cosmetic formulas. However, the product obtained does not come close to fulfilling the white oil requirements. Indeed, the iodine value of the hydrogenated product, which characterizes the unsaturation degree of the product, is much too high.

German Patent Application No. 2,360,306, teaches the hydrogenation of polybutene at a temperature of between 150° and 230° C and at a pressure of between 15 and 35 atmospheres, in the presence of nickel or palladium on kieselguhr, but the iodine value of the hydrogenated product is about 1.

U.S. Pat. No. 3,100,808, teaches the hydrogenation of polybutene under operating conditions similar to those described in the hereabove German patent application, in the presence of nickel, palladium or platinum on alumina, but the iodine value of the hydrogenated product is higher than 1. Such iodine values are absolutely too high in order for the hydrogenated product to fulfill the white oil requirements.

SUMMARY OF THE INVENTION

It is an object of the present invention to provide a process for producing high quality white oils, especially white oils exhibiting a relatively low iodine value.

It is a further object of the present invention to provide a hydrogenation process, especially a one-step process for producing such white oils from polymers derived from olefin units containing 4 carbon atoms It is a further object of the present invention to provide a process which permits hydrogenation under relatively mild reaction conditions.

It is a further object of this invention to provide such a process by which allows preparation of hydrogenated products the iodine value of which is less than 0.26.

In order to accomplish the foregoing objects, there has been provided according to the present invention a process for hydrogenating a liquid polymer derived from olefin units containing 4 carbon atoms which comprises the step of hydrogenating said polymer at a hydrogen pressure of between about 20 and about 120 kg/cm$^2$, and at a temperature of between about 130° and about 250° C in the presence of a catalyst comprising palladium on an alumina support exhibiting a total pore volume of at least about 0.25 ml/g, wherein 35 to 50% of the pore volume are provided by small pores the sizes of which are distributed around a mean size of less than 300Å ± 50Å and 25 to 35% of the pore volume are provided by large pores the sizes of which are distributed around a mean size of above 300Å ± 50Å, with the mean size of the large pores being at least 1.5 times the mean size of the small pores.

The liquid hourly space velocity may be between about 0.25 and 4 l/hr$^{-1}$. A suitable hydrogen:polymer ratio is between about 250 and about 6,000 Nl/l. Preferably, the reaction is effected under reaction conditions which are sufficient to yield a hydrogenated product, the iodine value of which is below 0.26.

DETAILED DESCRIPTION OF PREFERRED EMBODIMENTS

The term "a liquid polymer derived from olefin units containing 4 carbon atoms" not only comprises butene polymers, but also isobutene polymers and butene and isobutene copolymers, whereby all these homopolymers and copolymers are liquid or oily products. Such polymers generally have a molecular weight of between about 300 and about 2,000.

The hydrogenation catalyst of the present invention comprises palladium on an alumina support. The alumina support must be a bimodal support having a total pore volume of at least 0.25 ml/g, preferably of about 0.25 to about 2.5, most preferably between 0.25 and 1 ml/g, wherein 35 to 50% of this total volume are provided by small pores the general size of which is distributed around a mean size lower than 300A ± 50A and 25 and to 35% of this total volume are provided by large pores the general size of which is distributed around a mean size above 300A ± 50A, whereby the mean size of the latter is at least about 1.5 times, preferably about 1.5 to about 5,000 times, the means size of the former.

The mean pore sizes and the recommended percentages of pores for each size are dependent on each other and are essential operating conditions, and if either of these conditions is not met, the resulting product does not fulfill the white oil requirements, as is shown in the comparative examples below.

Preferably mean size of the small pores is between about 30 and about 300A, and particularly between about 50 and about 150A, whereas that of the larger pores is between 300A ± 50A and about 150,000 A, and the mean size of the larger pores always is at least 1.5 times, more particularly between about 10 and 1,000, most preferably between 10 and 200, that of the small pores. Moreover, the percentage of pore volume which is provided by the small pores must always be at least equal to that which is provided by the large pores.

The amount of palladium which is present in the catalyst is generally between about 0.25 and about 1.5% by weight, and more particularly between about 0.4 and about 0.9% by weight, based on the total catalyst weight.

The catalyst which is used according to the present invention may be preferred according to conventional impregnation techniques. Typically the support material is impregnated with an aqueous solution of a solauble palladium compound. The soluble compound is used as a precursor of the metal itself and the desired metal is formed on the support by a chemical treatment or a thermal treatment of the impregnated support material. The impregnation may also be carried out by other conventional processes according to which the support particles are impregnated with immersed or suspended in or otherwise introduced into an impregnation solution in order to absorb a soluble palladium compound.

On the other hand, the catalyst may be shaped in various forms and particularly in the form of granules, extrudates, cylinders, particles, beads or powder. The hydrogenation process according to the present invention may be carried out by using any catalytic hydrogenation technique, e.g., batchwise or in a continuous process, and in the latter case, either a fixed bed or a moving bed or a fluidized bed, procedure may be used.

The reaction temperature and pressure at which the hydrogenation process is carried out are dependent on each other and the above defined ranges should be observed.

Moreover, it is well known that the higher the temperature and the pressure are the more complete the hydrogenation is and thus the lower the iodine value of the hydrogenated product. An important advantage of the present invention is that the hydrogenation may be carried out at a temperature as low as 130° C, in order to obtain a hydrogenated product having an iodine value lower than 0.26, while the applied pressure is not very high, this pressure being about 75 kg/cm$^2$. On the other hand, a hydrogenated product having a very low iodine value may be obtained with a pressure as low as 20 kg/cm$^2$ at a temperature which does not exceed 250° C. Usually the temperature is between about 130° and 250° C, and the pressure is between about 20 and 120 kg/cm$^2$. Both variables can easily be selected and determined by the skilled worker in the art, in order to obtain a hydrogenated product having an iodine value lower than 0.26. Such temperature and pressure conditions are considerably milder than those which are used in conventional processes for obtaining white oils wherein the pressure generally must be at least 130 kg/cm$^2$.

The other operating conditions such as the hourly space velocity of the liquid and the hydrogen:polymer ratio also have an influence on the iodine value and therefore on the degree of hydrogenation of the resulting product, but this influence is not so important as that due to temperature or pressure. Generally, the liquid hourly space velocity is between about 0.25 and about 4 l/hr$^{-1}$, and particularly between about 0.5 and about 2 l/hr$^{-1}$. The hydrogen:polymer ratio usually varies between about 250 and about 6,000 Nl/l, and still higher ratios may be used, but without any significant advantage.

The obtained hydrogenated products have been submitted to "BP acid test", DAB VII test and FDA tests, in order to determine their usefulness as white oils and medicinal oils.

According to the DAB VII requirements, the product must be tested for the absorption of ultraviolet light at 275, 295 and 300 nanometers, in a cell of 1 cm size. The maximum of absorption at each wavelength must be lower than 1.6, 0.2 and 0.15, respectively.

The "BP acid test" consists of a colorimetric determination of carbonizable matters in a liquid paraffin using an extraction with sulfuric acid. The colorimetric indices according to the Lovinbond scale, which may not be exceeded are 2.5 in the red range and 6.5 in the yellow range, when the experiments are performed in a cell of 10 mm size.

The FDA test consists of three tests, the first of which concerns the determination of the carbonizable matters according to a colorimetric method. The colorimetric indices, according to the Lovinbond scale, which may not be exceeded are 2.1 in the red range, and 9 in the yellow range. The second test concerns the analysis of the sulfurized products, and the third consists of the determination of the absorbance of ultraviolet light of the extract with DMSO of the test product, whereby this absorbance must not exceed 0.1 at wavelengths comprised between 260 and 350 nanometers when the experiment is performed in a cell of 1 cm size.

The following examples are given in order to better illustrate the features and advantages of the present invention, but without limiting it.

EXAMPLE 1

A hydrogenation catalyst the support of which consists of alumina extrudates having a diameter of 1.5 mm, is prepared. The specific surface is 174 m$^2$/g. The total pore volume is 0.81 ml/g. This pore volume has the following distribution:

0.37 ml/g, or 45.7% of the total pore volume are provided by small pores the size of which is distributed around a mean size of 65Å, 0.25 ml/g, or 30.9% of the total pore volume are provided by large pores, the size of which is distributed around a mean size of 6,000Å.

Thereafter a palladium chloride solution is prepared by introducing 3.05 g of PdCl$_2$ into 145 g of distilled water and adjusting the pH to 1 by addition of concentrated hydrochloric acid. The mixture is heated to about 60° C until the dissolution of the salt is substantially completed and then filtered after cooling. Analysis shows that the solution contains 1.24 g Pd per 100 g solution. To 95.31 g solution, distilled water is added to obtain a total weight of 324 g. Thereafter this solution is poured on 162 g of alumina support which is previously calcined at 500° C and cooled. The mixture is allowed to stand during 16 hours and the solution is decanted. The humid catalyst is introduced into a store and dried at 120° C. The catalyst is then calcined at the air at 500° C and reduced with hydrogen at 500° C. The reduced catalyst contains 0.7% by weight of palladium.

With this catalyst, the continuous hydrogenation of a butene polymer the characteristics of which are given in Table I below, is performed:

TABLE I

| Characteristic | Method of determination | |
|---|---|---|
| Specific gravity 15/4° C | ASTM D 1298 | 0.838 |
| Viscosity | | |
| at 37.8° C (C stokes) | ASTM D 445 | 27.34 |
| at 98.8° C (C stokes) | ASTM D 445 | 4.88 |
| at 37.8° C (SSU) | | 127 |
| Viscosity Index | ASTM D 2270 | 110-111 |
| Molecular weight | | 650 |
| Saybolt color | ASTM D 156 | +18 |
| Iodine value | IP 84 | 128.3 |

The operating conditions under which the hydrogenation is performed and the properties of the hydrogenated product obtained in each experiment are indicated in Table II hereinbelow.

TABLE II

| Characteristics | Experiments | | | | | |
|---|---|---|---|---|---|---|
| | 1 | 2 | 3 | 4 | 5 | 6 |
| Temperature (° C) | 130 | 240 | 178 | 156 | 178 | 230 |
| Liquid hourly space velocity (hr$^{-1}$) | 1 | 1 | 1 | 1 | 1 | 1 |
| Pressure (kg/cm$^2$) | 75 | 75 | 75 | 50 | 75 | 35 |
| Hydrogen:polymer ratio (Nl/l) | 300 | 300 | 300 | 300 | 5000 | 5000 |
| Specific gravity 15/4° C | 0.838 | 0.838 | 0.838 | 0.838 | 0.838 | 0.838 |
| Viscosity at 37.8° C (C stokes) | 27.34 | 27.34 | 27.34 | 27.34 | 27.34 | 27.34 |
| at 98.9° C (C stokes) | 4.88 | 4.88 | 4.88 | 4.88 | 4.88 | 4.88 |
| at 37.8° C (SSU) | 127 | 127 | 127 | 127 | 127 | 127 |
| Viscosity Index | 110/111 | 110/111 | 110/111 | 110/111 | 110/111 | 110/111 |
| Saybolt color | >+30 | >+30 | >+30 | >+30 | >+30 | >+30 |
| Iodine value | 0.14 | 0.06 | 0.08 | 0.24 | 0.07 | 0.26 |
| "BP acid test" | conform 1.7R 4.0Y | conform 0.6R 1.3Y | conform 0.9R 2.1Y | conform 2.2R 6.5Y | conform 0.9R 2.1Y | conform 2.5R 6.5Y |
| DAB VII - UV absorption Cell 1 cm 275 nm | 0.05 | 0.04 | 0.04 | 0.08 | 0.04 | 0.14 |
| 295 nm | 0.01 | 0.01 | 0.01 | 0.02 | 0.01 | 0.02 |
| 300 nm | 0.01 | 0.01 | 0.01 | 0.01 | 0.01 | 0.01 |
| FDA Sulfurized compound | conform | conform | conform | conform | conform | conform |
| Polynuclear aromatics Cell 1 cm 260/350 nm | conform | conform | conform | conform | conform | conform |
| USP acid test | conform 1.6R 4.0Y | conform 0.5R 1.3Y | conform 0.8R 2.0Y | conform 2.0R 6.5Y | conform 0.8R 2.0Y | conform 2.1R 8.5Y |
| Odor | | | odorless | | | |

Y = Yellow range on the Lovibond scale.
R = Red range on the Lovibond scale.

By way of comparison, hydrogenation of a polybutene the characteristics of which are described in Table I, is performed with catalysts wherein the support on which the metal is deposited is outside the scope of the present invention.

In a comparative experiment 1, the support of the catalyst consists of alumina granules having a total pore volume of 0.39 ml/g, wherein 0.24 ml/g or 61% of that total pore volume is provided by small pores the size of which is distributed around a mean size of 55A. The remainder of the total pore volume is provided by pores the size of which is substantially uniformly distributed between sizes varying between 100 and 10,000A. Palladium is deposited on this support according to a known process and the final catalyst contains 0.57% by weight of palladium.

In the comparative experiment 2, the support of the catalyst consists of kieselguhr on which palladium is deposited according to a known process, and the final catalyst contains 0.6% by weight of palladium.

In the comparative experiment 3, a catalyst is tested the support of which consists of alumina granules having a total pore volume of 0.77 ml/g, wherein 0.32 ml/g or 42% of that total volume is provided by pores the size of which is distributed around a mean size of 65A and 0.25 ml/g or 32% of that are provided by pores the size of which is distributed around a mesh size of 6,000A. Platinum is deposited on this support according to a known process and the final catalyst contains 0.64% by weight of platinum The hereinbelow Table III indicates the operating conditions under which the hydrogenation is preformed, and the properties of the hydrogenated product.

TABLE III

| Characteristics | Comparative experiment | | |
|---|---|---|---|
| | 1 | 2 | 3 |
| Temperature (° C) | 240 | 160 | 180 |
| Liquid hourly Space velocity (hr$^{-1}$) | 1 | 1 | 1 |
| Pressure (kg/cm$^2$) | 100 | 17 | 75 |

TABLE III-continued

| Characteristics | Comparative experiment | | |
|---|---|---|---|
| | 1 | 2 | 3 |
| Hydrogen:polymer ratio (Nl/l) | 300 | 300 | 300 |
| Density 15/4° C | 0.838 | 0.838 | 0.838 |
| Viscosity at 37.8° C (C stokes) | 27.34 | 27.34 | 27.34 |
| at 98.9° C (C stokes) | 4.88 | 4.88 | 4.88 |
| at 37.8° C (SSU) | 127 | 127 | 127 |
| Viscosity Index | 110/111 | 110/111 | 110/111 |
| Saybolt color | +30 | +30 | +30 |
| Iodine value | 2.3 | 1.08 | 4.4 |
| "BP acid test" | | not conform | |
| DAB VII - UV absorption cell 1 cm 275 nm | 0.30 | 0.15 | 0.60 |
| 295 nm | 0.05 | 0.03 | 0.07 |
| 300 nm | 0.03 | 0.02 | 0.04 |
| FDA Sulfurized compounds | | conform | |
| Polynuclear aromatics cell 1 cm - 260-350 nm | | conform | |
| USP acid test | | not conform | |
| Odor | | unsatisfactory | |

EXAMPLE 2

The process which is described in Example 1 is repeated in order to obtain a catalyst containing 0.41% by weight of palladium based on the weight of the catalyst, on a support consisting of alumina granules having a total pore volume of 0.32 ml/g wherein 45% of that total pore volume is provided by pores the size of which is distributed around a mean size of 125Å and 27.5%, distributed around a mean size of 600Å.

In the presence of this catalyst, a polybutene whose characteristics are described in Table I of Example 1, was hydrogenated under the following operating conditions.

| Temperature | 160° C |
|---|---|
| Pressure | 75 kg/cm$^2$ |
| Liquid Space velocity | 2 hr$^{-1}$ |
| Hydrogen:polymer ratio | 500 Nl/l |

The hydrogenated product has the following properties:

| | | |
|---|---|---|
| Saybolt color | +30 | |
| Iodine value | 0.15 | |
| BP acid test | conform | 1.7R 4.1Y |
| DAB VII - UV absorption | | |
| Cell 1 cm - 275 nm | 0.05 | |
| 295 nm | 0.01 | |
| 300 nm | 0.01 | |
| FDA | | |
| Sulfurized compounds | conform | |
| Polynuclear aromatics | | |
| Cell 1 cm - 260-350 nm | conform | |
| USP acid test | conform | 1.6R 4.1Y |

By way of comparison, a catalyst is prepared according to the process described in Example 1, which contains 0.49% by weight based on the total weight of catalyst, of palladium on an alumina support having a total pore volume of 0.34 ml/g wherein 16% of that total pore volume is provided by pores the size of which is distributed around a mean size of 35Å and 74% of that total pore volume is provided by pores the size of which is distributed around a mean size of 300Å.

In the presence of this catalyst, a polybutene, the characteristics of which are described in Table I of Example 1, is hydrogenated under the hereinabove described operating conditions.

The hydrogenated product has the following properties:

| | |
|---|---|
| Saybolt color | +30 |
| Iodine value | 1.2 |
| BP acid test | not conform |
| DAB VII - UV absorption | |
| Cell 1 cm 275 nm | 0.18 |
| 295 nm | 0.03 |
| 300 nm | 0.02 |
| FDA | |
| Sulfurized compounds | conform |
| Polynuclear aromatics | |
| cell 1 cm - 260-350 nm | conform |
| USP acid test | not conform |
| Odor | unsatisfactory |

EXAMPLE 3

The process described in Example 1 is repeated in order to obtain a catalyst containing 0.92% by weight based on the total weight of catalyst, of palladium on an alumina support having a total pore volume of 0.32 ml/g wherein 45% of that total pore volume is provided by pores the size of which is distributed around a mean size of 125Å and 27.5% of that total pore volume is provided by pores the size of which is distributed around a mean size of 600Å.

In the presence of this catalyst, a polybutene the characteristics of which are described in Table I of Example 1, is hydrogenated under the following operating conditions:

| | |
|---|---|
| Temperature | 200° C |
| Pressure | 75 kg/cm$^2$ |
| Liquid-Space velocity | 1 hr$^{-1}$ |
| Hydrogen:polymer ratio | 500 Nl/l |

The hydrogenated product has the following properties:

| | | |
|---|---|---|
| Saybolt color | +30 | |
| Iodine value | 0.08 | |
| BP acid test | conform | 0.9R 2.1Y |
| DAB VII - UV absorption | | |
| Cell 1 cm 275 nm | 0.04 | |
| 295 nm | 0.01 | |
| 300 nm | 0.01 | |
| FDA | | |
| Sulfurized compounds | conform | |
| Polynuclear aromatics | | |
| Cell 1 cm 260-350 nm | conform | |
| USP acid test | conform | 0.8R 2.0Y |
| Odor | Odorless | |

While the invention has now been described in terms of certain preferred embodiments, and exemplified with respect thereto, the skilled artisan will appreciate that various modifications, changes, substitutions, and omissions may be made without departing from the spirit thereof. Accordingly, it is intended that the scope of the present invention be limited solely by that of the following claims.

What is claimed is:

1. A process for hydrogenating a liquid polymer derived from olefin units containing 4 carbon atoms, which comprises the step of hydrogenating said polymer at a hydrogen pressure of between about 20 and about 120 kg/cm$^2$, a liquid hourly space velocity of between about 0.25 and 4 hr$^{-1}$, a hydrogen:polymer ratio of between about 250 and 6,000 Nl/l, and at a temperature of between about 130° and about 250° C in the presence of a catalyst comprising palladium on an alumina support, said support exhibiting a total pore volume of from about 0.25 ml/g to about 2.5 ml/g, wherein about 35 to about 50% of said pore volume is provided by small size pores having a pore size distribution lower than about 300Å and about 25 to about 35% of said pore volume is provided by large size pores having a pore size distribution higher than about 300Å and wherein the pore size distribution of the large size pores is at least 1.5 times that of the small size pores, whereby a white oil having an iodine number of less than about 0.26 is obtained.

2. The process as defined in claim 1, wherein the polymers are selected from the group consisting of butene polymers, isobutene polymers and copolymers of butene and isobutene.

3. The process as defined in claim 2, wherein the molecular weight of the polymer is between about 300 and about 2,000.

4. The process as defined in claim 1, wherein the catalyst contains between about 0.25 and about 1.5% by weight of palladium.

5. The process as defined in claim 4, wherein the catalyst contains between about 0.4 and 0.9% by weight of palladium.

6. The process as defined in claim 1, wherein the catalyst support comprises a bimodal alumina wherein the small pores have a pore size distribution of between about 30 and about 300Å and the large pores have a pore size distribution of between about 300Å and about 150,000Å.

7. The process as defined in claim 6, wherein the pore size distribution of the small pores is between about 50 and about 150Å.

8. The process as defined in claim 6, wherein said pore volume provided by the small pores is at least equal to said pore volume provided by the large pores.

9. The process as defined in claim 6 wherein the shape of the catalyst support is consists of extrudates in the form of cylinders.

10. The process as defined in claim 9, wherein the catalyst support is a powder.

11. The process as defined in claim 9, wherein the catalyst is a granulate.

12. The process as defined in claim 6 wherein the shape of the catalyst support consists of beads.

* * * * *